(12) United States Patent
Sexton et al.

(10) Patent No.: US 6,454,282 B2
(45) Date of Patent: Sep. 24, 2002

(54) CART FOR FOLDING TABLES

(75) Inventors: Kenny A. Sexton, Springdale; Harry D. Leeds, Clarksville; Donald R. Elmore, Springdale, all of AR (US)

(73) Assignee: Table Toter, Inc., Springdale, AR (US)

( * ) Notice: Subject to any disclaimer, the term of this patent is extended or adjusted under 35 U.S.C. 154(b) by 0 days.

(21) Appl. No.: 09/755,800

(22) Filed: Jan. 5, 2001

Related U.S. Application Data

(63) Continuation-in-part of application No. 09/333,258, filed on Jun. 15, 1999.

(51) Int. Cl.[7] ................................................. B62B 3/08
(52) U.S. Cl. .................... 280/79.7; 280/47.35; 211/41.1
(58) Field of Search .......................... 280/47.35, 47.34, 280/43.11, 79.11, 79.3, 79.7; 211/41.1

(56) References Cited

U.S. PATENT DOCUMENTS

| | | | |
|---|---|---|---|
| 2,466,149 A | 4/1949 | Burg ........................ | 280/79.7 |
| 2,621,815 A | 12/1952 | Gannon ..................... | 280/79.7 |
| 2,947,565 A | 8/1960 | Wood ........................ | 280/79.7 |
| 3,031,084 A | 4/1962 | Mugler ...................... | 280/79.7 |
| 3,669,464 A | 6/1972 | Linzmeier .................. | 280/79.7 |
| 3,889,814 A | 6/1975 | Rice ........................... | 211/27 |
| 4,033,597 A | 7/1977 | Boyer ........................ | 280/46 |
| D248,937 S | 8/1978 | Figueroa ..................... | D12/26 |
| D288,739 S | 3/1987 | Johnson et al. .............. | D34/17 |
| 5,037,117 A | 8/1991 | Hershberger ............... | 280/79.7 |
| 5,163,695 A | 11/1992 | Pakowsky .................. | 280/79.7 |
| 5,226,656 A | 7/1993 | Mayer ........................ | 280/79.2 |
| 5,244,221 A | 9/1993 | Ward .......................... | 280/79.7 |
| 5,318,316 A | 6/1994 | Shurtleff ..................... | 280/79.7 |
| 5,584,399 A | 12/1996 | King ........................... | 211/41 |
| 5,788,251 A | 8/1998 | Johnson .................... | 280/43.17 |
| 5,820,145 A | 10/1998 | Osowski ..................... | 280/79.7 |
| 5,871,219 A | 2/1999 | Elliott ........................ | 280/79.3 |
| 5,899,469 A * | 5/1999 | Pinto et al. ............... | 280/47.35 |
| 6,296,262 B1 * | 10/2001 | Skinner ..................... | 280/79.7 |

FOREIGN PATENT DOCUMENTS

| | | | |
|---|---|---|---|
| CH | 670605 | 6/1989 | ............. B62B/3/04 |
| DE | 3604657 | 8/1987 | ............. B52B/3/04 |
| FR | 1323664 | 3/1963 | |
| GB | 1084866 | 9/1967 | ............. B62B/3/02 |
| SU | 1158429 | 5/1985 | ............. B62B/3/02 |
| SU | 1661032 | 7/1991 | ............. B62B/3/02 |

* cited by examiner

*Primary Examiner*—Brian L. Johnson
*Assistant Examiner*—Jeffrey J. Restifo
(74) *Attorney, Agent, or Firm*—Womble Carlyle Sandridge & Rice, PLLC

(57) ABSTRACT

A cart for heavy folding tables facilitates the loading, folding, erection, and unloading of one or more conventional folding tables therefrom, by a single person without substantial effort by the person performing the operation. The present cart includes a table receiving bed at such a height that a table tipped with its lower edge resting upon the base is slightly overbalanced toward the lower edge, with nearly all of the weight of the table still resting upon its lower two legs. The base of the cart includes a series of ridges forming pairs of notches for holding the lower edge of tables placed thereon.

10 Claims, 7 Drawing Sheets

CART FOR FOLDING TABLES

REFERENCE TO RELATED APPLICATIONS

This application is a continuation-in-part of U.S. application Ser. No. 09/333,258 filed Jun. 15, 1999.

BACKGROUND OF THE INVENTION

(1) Field of the Invention

The present invention relates generally to hand trucks, carts, and the like, and more specifically to a hand cart for facilitating the folding, loading, carriage, storage, unloading, and erection of conventional rectangular or round heavy folding tables of the type having opposed pairs of folding legs secured by inwardly disposed folding diagonal braces. The present cart has a configuration permitting a single person to accomplish the above operations easily, by allowing the tables to be easily tilted angularly onto and off the cart and to be tipped for the folding and unfolding of the legs.

(2) Description of the Prior Art

Conventional heavy, elongate and round folding tables are almost universally used for various large gatherings (church suppers, hotel banquets, conventions, school events, etc.). These tables have found favor for such functions due to their relatively large size and durability, and the folding leg feature which allows them to be stored relatively compactly. However, the durability of such tables results in a relatively heavy weight for such units, generally on the order of about forty pounds for a table having a length of about five feet and a width of about two feet, with these numbers varying depending upon the exact size of the table. Such tables are also available in a round configuration having a diameter of four to six feet.

Given that many times older adult volunteers or perhaps younger children assist in setting up and putting away such tables at various church, school, and other organizational functions, the weight and bulk of such tables can generally require at least two persons per table, both for setting up such tables and for folding them and putting them away. Generally, such tables are picked up by one person at each end, tipped to extend or fold the legs as required, and set up for use or placed flat on a cart or the like for movement to a storage area, or perhaps carried directly to the storage area by one person at each end of the table. The result is relatively slow and tedious, and can still be quite taxing for the personnel involved.

The most relevant prior art includes U.S. Pat. No. 248,937 to Figueroa issued Aug. 15, 1978; U.S. Pat. No. 3,669,464 to Linzmeier issued Jun. 13, 1972; U.S. Pat. No. 5,037,117 to Hershberger issued Aug. 6, 1991; U.S. Pat. No. 5,163,695 to Pakowsky issued Nov. 17, 1992; U.S. Pat. No. 5,226,656 to Mayer issued Jul. 13, 1993; and U.S. Pat. No. 5,871,219 to Elliott issued Feb. 16, 1999.

SUMMARY OF THE INVENTION

The present invention is directed to a wheeled cart which is so designed as to facilitate the folding, loading, unloading, and erecting of heavy folding tables. The cost includes a cart includes base frame having an elevated table receiving and supporting bed. An upright support extends upwardly and angularly from one side or edge of the base at a steep, but non-vertical, downward slope from its upper edge toward the corresponding side or edge of the cart. A series of continuous or segmented guide ridges are formed in or on the supporting bed, parallel to the plane formed by the face of the upright support, and defining a corresponding series of table edge holding notches or channels therebetween. The edges of a series of folding tables or the like are retained in the notches. The base frame is of such dimensions as to be emplaced between the folding leg members of a table and will receive and transport rectangular or circular tables. While rectangular and round tables are those currently available, should other shapes appear in the future, it is believed the cart of the present invention would provide the same support characteristics. The bed is of such height that when a table is tipped, the lower edge of the tipped table quickly comes to rest in one pair of notches, with nearly all of the weight of the table still being supported by the legs closest to the lower edge. The height of the bed above the underlying supporting surface (floor, etc.) is such that the weight of the table resting on the cart is very little in comparison to the weight on the two legs still resting upon the underlying surface. In other words, the table is only very slightly overbalanced toward the lower edge, when it is resting upon the present cart. This allows one person to lift one edge of the table and tilt it toward the cart, without requiring great strength to keep the table from falling onto its lower edge with any significant force.

The steep, non-vertical slope of the upright support of the cart is such that after the lower edge of the table has been placed in one of the channels of the base, the upper edge may be lifted so that the table top is resting against the support structure (or against another table which is in turn resting directly or indirectly against the structure), with the table in a stable orientation, i.e., leaning against the support structure (or other table) rather than falling back toward the lower legs. This allows one person to easily fold the legs of the table against the underside of the table top, without requiring that person to simultaneously hold the table in an on-edge orientation to preclude its falling back upon the lower legs. The folding of the legs against the underside of the table top, moves the center of gravity of the table even closer to the table top, thus increasing the stability of the folded table resting upon the present cart. The above described operation is easily reversed for unloading and erecting tables from the present cart.

Accordingly, it is a principal object of the invention to provide an improved cart for folding tables which facilitates the handling of conventional folding tables and which reduces the physical force required for one person to erect, fold, and store such tables.

It is another object of the invention to provide an improved cart for folding tables having a relatively high table supporting bed to reduce the effort necessary to load and unload the table.

It is a further object of the invention to provide an improved cart for folding tables having a tilted table support with a steep but non-vertical slope, such that a table having its top surface resting against the slope, is in a stable disposition and slightly overbalanced to bear against the slope of the support.

An additional object of the invention is to provide an improved cart for folding tables with a base having a plurality of notches defining a corresponding plurality of channels or slots therebetween. Each set of notches provides a nest for receiving the lower edge of a tipped table.

Still another object of the invention is to provide an improved cart for folding tables including a plurality of castering wheels beneath the base. It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
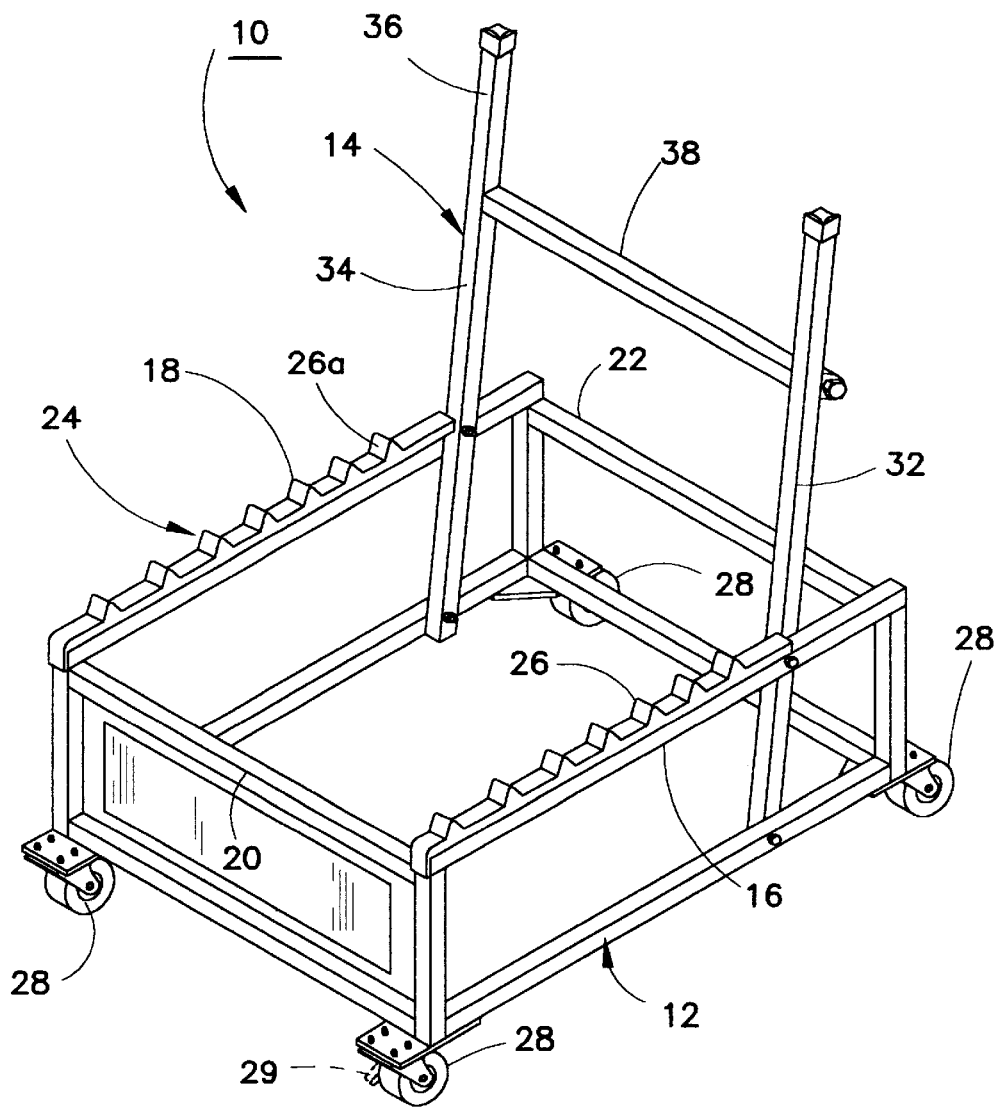
FIG. 1 is a perspective view of the present cart for folding tables in an unloaded condition, showing various features thereof.

The present invention is directed to a cart for heavy folding tables, with a perspective view of the present cart in an unloaded state being shown in FIG. 1 of the drawings and designated by the reference character 10. The present cart 10 is specifically configured to provide for ease of loading and unloading of conventional folding tables thereonto and therefrom, as will be seen in FIGS. 2 through 5 of the drawings, and discussed in detail further below.

The present cart 10 generally comprises a base frame 12. The base 12 is preferably constructed as a generally rectangular box frame with upper frame members 16, 18, 20, and 22 forming a table receiving bed 24. For this purpose end frame members 16, 18 include support runners on the upper side thereof with a plurality of guide ridges 26 formed therein and facing upwardly to define a plurality of table edge holding notches. The present cart 10 is preferably mounted on wheels or rollers for portability, with a plurality of fully castering or swiveling wheels 28 being installed beneath the base frame 12. The fully castering wheels 28 allow the cart 10 to be turned in any direction and to be rolled sideways through relatively narrow doorways and other narrow passages with a load of relatively elongate tables being carried thereon. At least one of the wheels may include a conventional foot or toe actuated locking brake means thereon if so desired, as indicated by the brake actuation lever 29 shown in broken lines on the right side wheel 28 of FIG. 2. The sides 20, 22 are of such a length that the cart may be positioned between the leg members of conventional tables of the type described preferably ≦45 inches). Alternatively, the cart might be U-shaped with the distance between the sides being greater than the distance between the folding legs, so that again, the cart can be placed beneath the erect table.

The base 12 has a table receiving bed 24 with a height above the underlying surface S (shown in FIGS. 2 through 5) which is predetermined to provide for the tipping of one edge of a folding table thereon. In such a position the table is just slightly overbalanced toward its lower edge which is resting upon the upper surface or bed 24 of the cart 10. By way of example, most folding tables have a height of approximately 30 inches. The construction of the base frame is such that the bed 24 is preferably positioned at a height in the range of 18½–20 inches. The opposed frame members 16, 18 include a series of spaced apart ridges 26, defining a corresponding series of notches therebetween.

The size, shape, and spacing of the ridges may vary depending on the edge configuration of the table for which they are intended to be used. It is only necessary that the notches formed between the ridges adequately hold the table in place when it is tilted into position. By way of example, only one configuration utilizes ridges about ¾" high and 3¼–3½ inches between ridges. In an alternative embodiment for rectangular tables only, the ridges may be formed by a series of slats or guides installed across an upper surface 128 of the base 112 and parallel to the plane of the table support 114 with a corresponding series of slots therebetween (See FIG. 7).

The tilted table support 14 of the cart 10 is a pair of opposed, spaced apart arms, respectively 32 and 34, which extend upwardly from opposite ends 16 and 18 of the base frame 12 adjacent and immediately inboard of the side 22. The arms 32, 34 form a non-vertical, but steeply sloped, tilted table support face 36, for leaning the top surface of a table thereagainst when a first table is placed upon the bed 24 with its lower edge resting between the table support face 36 formed by arms 32, 34 and the first pair of ridges 26a. The table support faces 36 is angled or sloped upwardly and outwardly from the base 12, so that a table leaning thereagainst with its legs extending over the plane of the base 12, is in a stable orientation with no tendency to fall back upon its legs. While the angle of support arms 32, 34 may vary somewhat, it has been found that an angle with the horizontal of about 80° is quite satisfactory. A lateral handle 38 is provided across the upper ends of (or elsewhere across or between) the two arms 32, 34.

The present cart for folding tables may be formed or constructed of virtually any practicable materials (metals, high density plastics, etc.), as desired. The exemplary cart 10 of FIG. 1 is formed of a series of welded bars forming the frame members, the arms 32, 34 and even the handlebar 38. Alternatively, the structure of the present cart lends itself well to the relatively simple cutting and carpentry operations required for construction from wood, which provides a solid and durable structure for the present cart as illustrated in FIG. 7.

Figure 7:
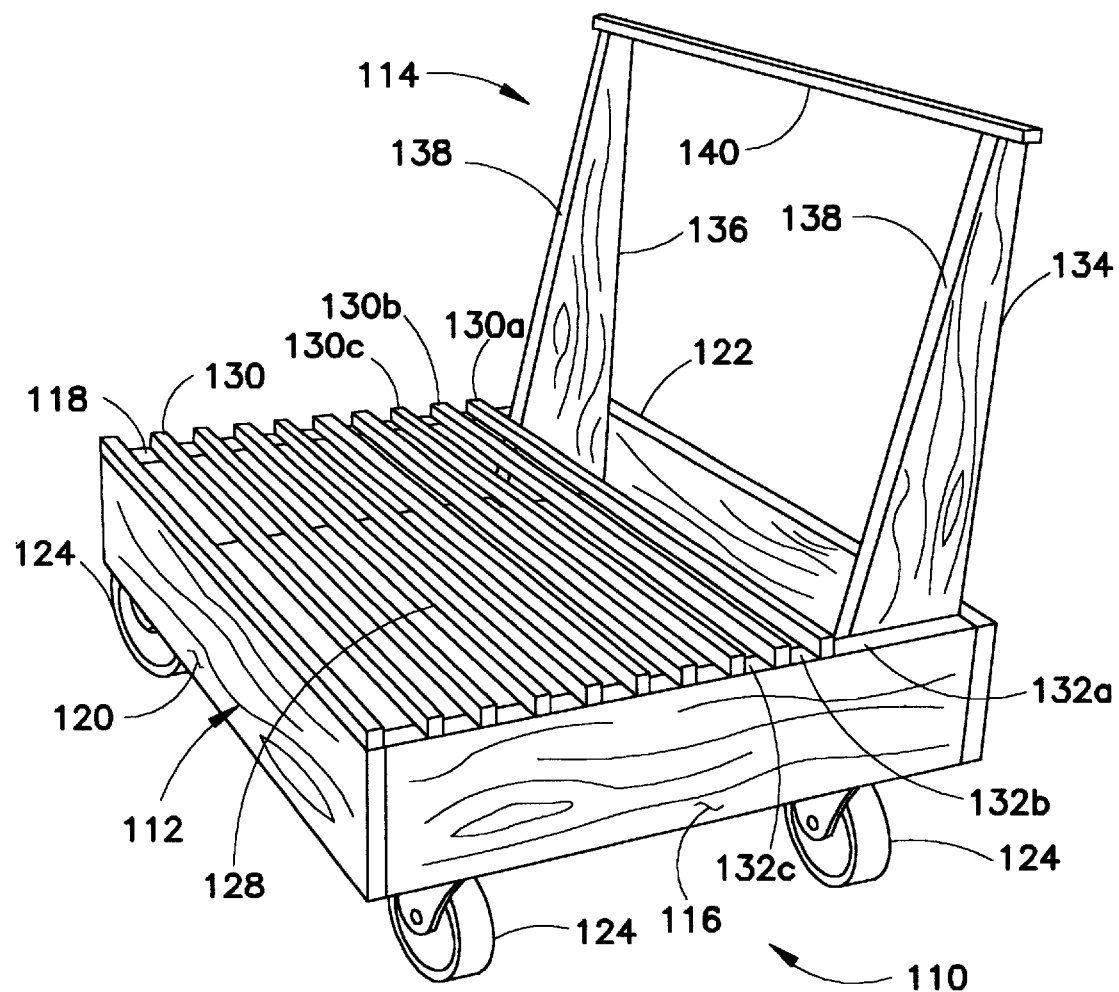
FIG. 7 is a perspective view similar to FIG. 1 except showing an alternative embodiment with a slotted surface table receiving bed.

In FIG. 7, the alternative embodiment illustrates a cart 110 generally comprising a base portion 112 with a tilted table support 114 extending upwardly from one side thereof. The base 112 is preferably constructed as a generally rectangular structure with four sides, respectively 116, 118, 120, and 122.

The base 112 has an upper surface 128 which includes a series of spaced apart ridges 130, comprising individual ridges 130a, 130b, 130c, etc. defining a corresponding series of channels 132a, 132b, 132c, etc. therebetween. The ridges may be formed by a series of slats installed across the upper surface 128 of the base 112 and parallel to the plane of the support 114, with a corresponding series of slots therebetween.

The table support 114 includes a pair of opposed, spaced apart risers, respectively 134 and 136, which extend upwardly from opposite ends 116 and 118 of the base 112 adjacent and immediately inboard of the first side 122. A lateral handle 140 may be provided across the upper ends of (or elsewhere across or between) the two risers 134 and 136.

FIGS. 2 through 5 comprise a series of schematic side elevation views showing the use of the present cart 10 in loading, folding, and carrying a series of folding tables thereon. The present cart 10 is particularly useful with conventional folding tables, exemplified by the first folding table F1 shown in FIGS. 2 through 5. The elongate folding table F1 includes a table top T having opposite first and second lateral edges E1 and E2, with an opposed pair of folding supports U (only one of which is shown in the end views of the folding table F1 of FIGS. 1 through 4, but it will be understood that the folding table F1 is conventional and symmetrical). Each of the supports U includes a first leg L1 and opposite second leg L2, generally corresponding to the same sides of the table F1 as the first and second edges E1 and E2.

Figure 2:
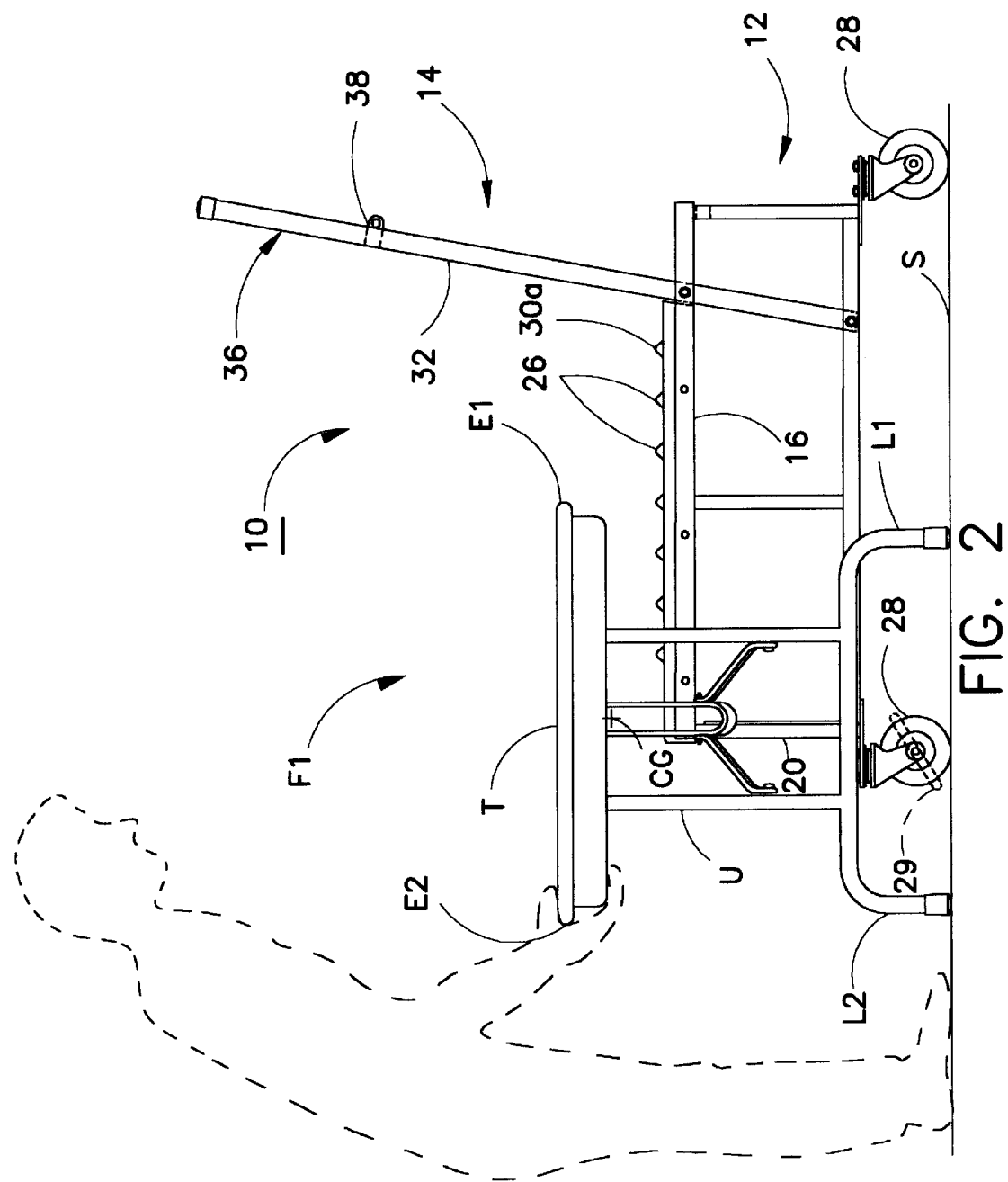
FIG. 2 is a side elevation view of the present cart positioned beneath a folding table, showing the initial step in loading a folding table onto the present cart.
Figure 3:
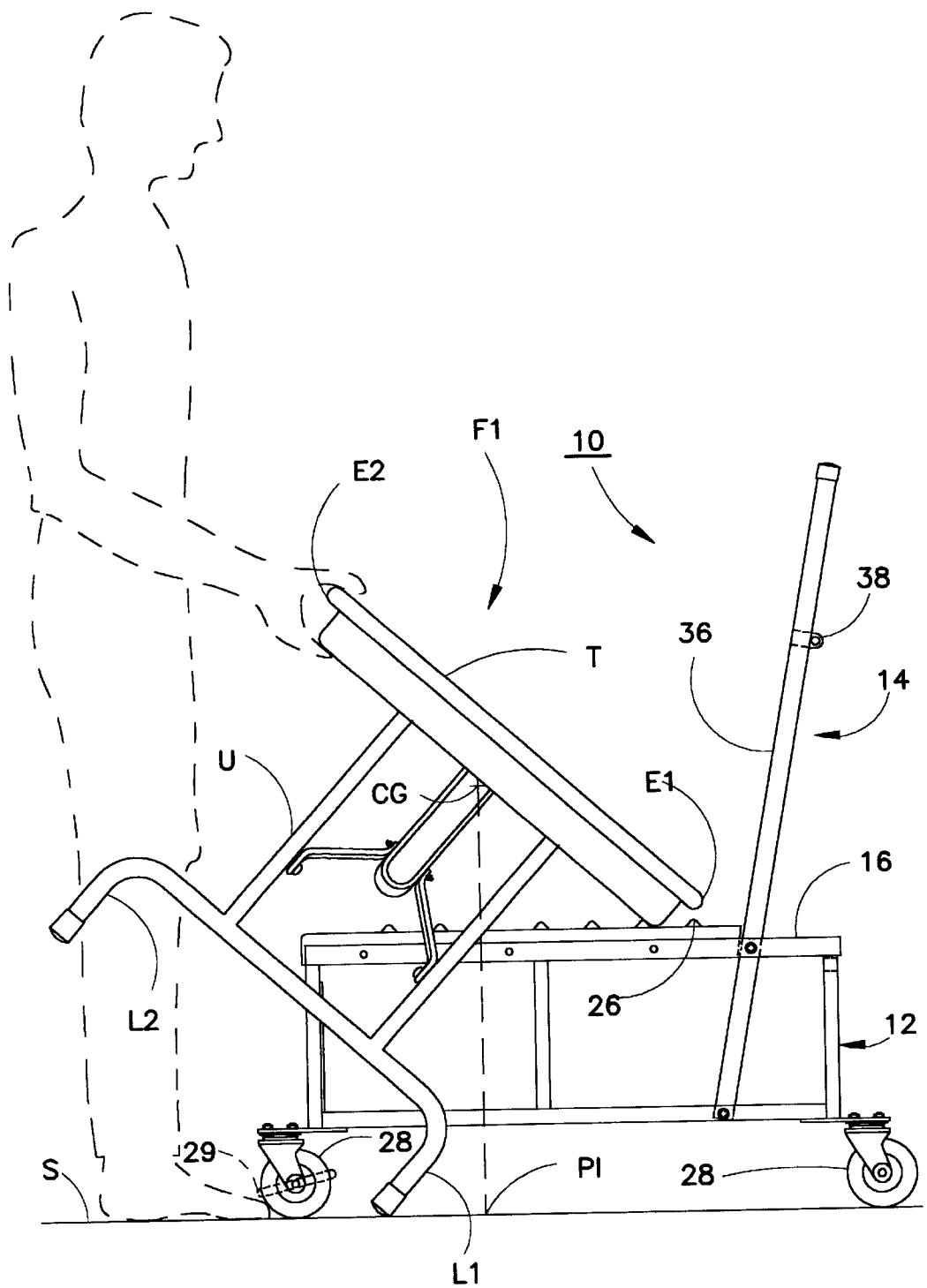
FIG. 3 is a side elevation view of the present cart with a person tipping a folding table onto the cart for storage and carriage thereon.

The present cart 10 is first rolled beneath an erected folding table F1 with its base frame 12 positioned partially beneath table top T, and the two arms 32, 34 of the tilted table support 14 facing the first edge E1 of the table F1, as shown in FIG. 2 of the drawings. A person then lifts the opposite second edge E2 of the table T to tip the first edge E1 downwardly toward the first notch of the bed 24 of the cart 10, as shown in FIG. 3. If the cart 10 is inadvertently positioned with the arms 32, 34 too close to the first edge E1 of the table T, the first edge E1 will contact the table top support face 36 formed by the two arms 32, 34 and slide downwardly until it comes to rest in the first notch of the cart 10.

It will be noted in the drawing Figures that the center of gravity CG of the folding table F1 with its folding supports U extended, is located very slightly below the top of the table F1. This due to the fact that the table top T is considerably heavier than the remainder of the structure of the table F1, i.e., the tubular folding supports U and legs L1 and L2.

The present cart for folding tables 10 is constructed with the bed 24 of the base frame 12 disposed above the underlying floor surface or S at the predetermined height (18½–20 inches) such that a folding table F1 which is tipped thereon with its lower edge E1 resting upon the upper surface 28 of the base 12 and its first legs L1 resting upon the underlying level surface S, is oriented with its center of gravity CG positioned vertically above a point P1 which is only slightly outside of the span of the legs L1 and L2. In other words, the first legs L1 of the folding table F1 are carrying nearly all of the weight of the table F1, with only a slight amount of the weight of the table F1 resting upon the base frame 12 of the cart 10.

Thus, when a person tilts the table F1 toward the base frame 12 and arms 32, 34 of the cart 10, the table F1 is stable, attempting to lower itself back to rest upon its four legs L1 and L2, until the table F1 is tipped to the degree that its center of gravity CG is positioned directly over the first legs L1 where they rest upon the underlying surface S. Beyond this point, the table F1 is unstable, tending to fall toward its first edge E1.

However, by this time the first edge E1 is so close to the table receiving bed 24 of the cart 10, that only a very slight additional tilt of the table F1 can occur before the first edge E1 is resting upon the cart 10. Thus, very little force is imposed upon the first edge E1 of the table F1 and the bed 24 of the cart 10, if the table F1 is dropped onto the cart 10 from its neutrally stable position during the tilting operation. This enables a single person to tilt a folding table F1 onto the cart 10, with the majority of the strength required being for lifting the second edge E2 of the table F1; very little, if any, strength being required to retard the fall of the first edge E1 of the table F1 after the tilt of the table F1 passes its point of neutral stability.

Figure 4:
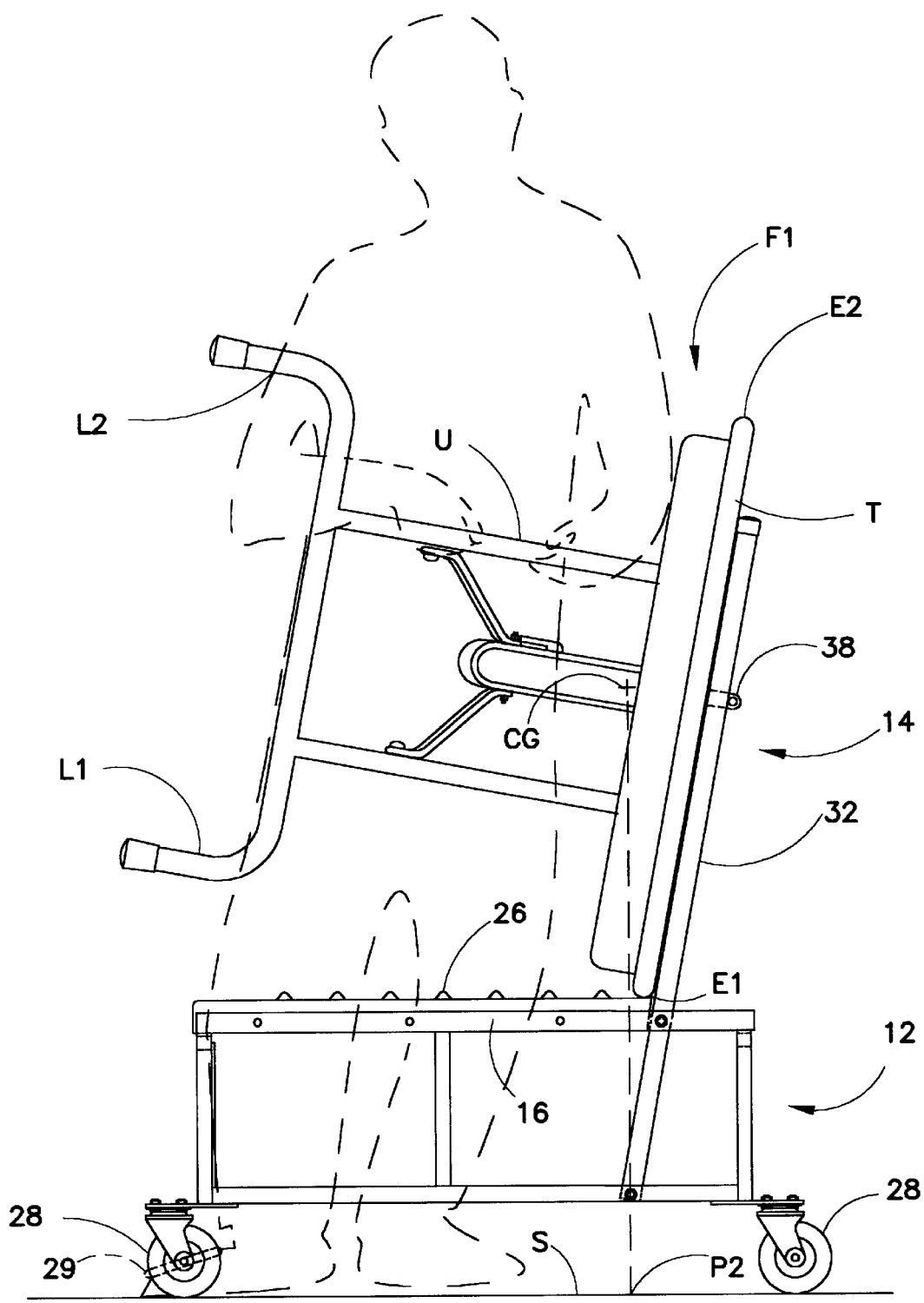
FIG. 4 is a side elevation view showing the next step in the loading of a table onto the present cart, with the table being placed completely upon the cart for folding the table legs.

From the position shown in FIG. 3 of the drawings, the person lifts the second edge E2 of the table F1 further to rotate the table F1 about its first or lower edge E1, which is now resting in the first notch of the cart 10, the second or upper edge E2 is lifted and rotated about the lower first edge E1 until the top T of the table F1 is resting against the table top support face 36 formed by the two arms 32, 34, as shown in FIG. 4 of the drawings. The angled slope defined by the tilted table support face 36 is such that the center of gravity CG of the table F1 with its top T leaning thereagainst, projects to a point P2 slightly beyond the table's first edge E1 resting in the first notch of the base 12. Thus, the table F1 would tend to fall over to an inverted position, resting upon its top T, if it were not for the restraint of the arms 32, 34.

As in the case of the first tilted position of the table F1 shown in FIG. 3 of the drawings, the present cart 10 is constructed with the table top support face 36 of the arms 32, 34 having a predetermined slope such that the table F1 is only very slightly overbalanced toward its top T in order to preclude any requirement for substantial restraining strength for preventing the table top T from falling with substantial force as it is tilted past the vertical. Yet, the angle of the support face 36 provides a sufficient slope to position the table F1 in a stable position with its top T resting against the arms 32, 34, even with the supports U of the table F1 extended as shown in FIG. 4 of the drawings.

At this point, the person may walk about the table F1 which has been loaded onto the cart 10 to fold the two supports U, without any requirement to hold the table F1 in position on the cart 10. The support folding operation need not be carried out with any haste or substantial strength on the part of the person folding the table F1, due to the stable position of the table F1 as it leans or rests against the arms 32, 34. It will be seen that this stable position will become even more stable as the supports U of the table F1 are folded against the underside of the table top T, thus positioning the center of gravity of the table F1 even closer to the top T, i.e., slightly further to the right of the position shown in the drawing of FIG. 4.

Figure 5:
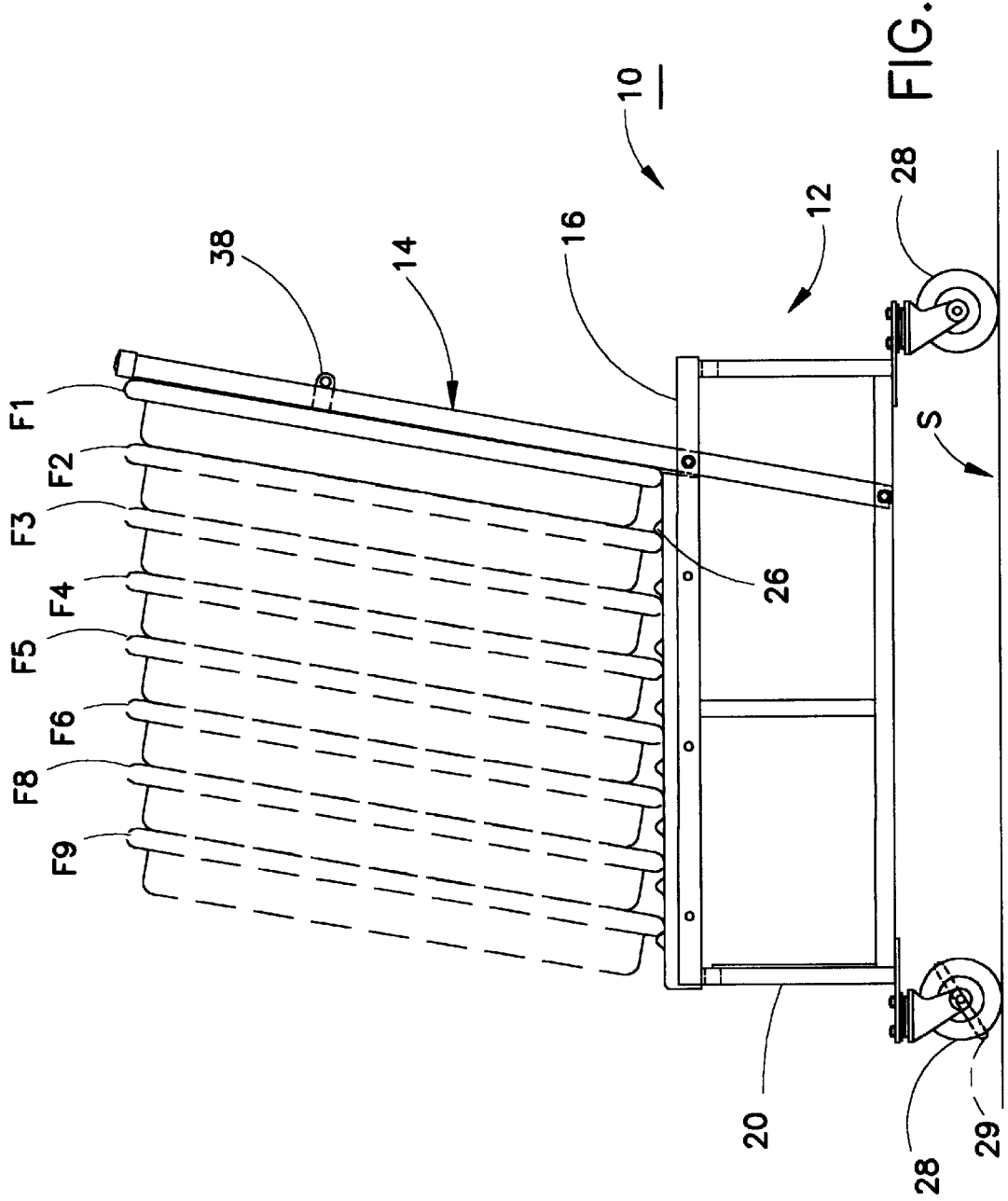
FIG. 5 is a side elevation view of the present cart, showing the storage of a plurality of folded tables thereon.

The above described operation describes in detail the loading of only a single folding table F1 on the present cart for folding tables 10. However, the present cart 10 is capable of holding a series of such folding tables, as illustrated in FIG. 5 of the drawings. In FIG. 5, the first folding table F1 is positioned with its top resting or leaning against the two arms 32, 34 and with its two supports U folded against the underside of its top T in the conventional manner for storing such folding tables F1. The operation shown in FIGS. 2 through 4 and described further above for placing and storing a folding table F1 upon the present cart 10, may be repeated as desired to place and store additional folding tables F2, F3, F4, etc. on the cart 10, with the storage capacity of the cart 10 being limited only by the length of the two ends 18 and 22 of the base 12 which extend from the two arms 32, 34, and the number of ridges 26 provided for holding each of the first edges of a series of folding tables.

Figure 6:
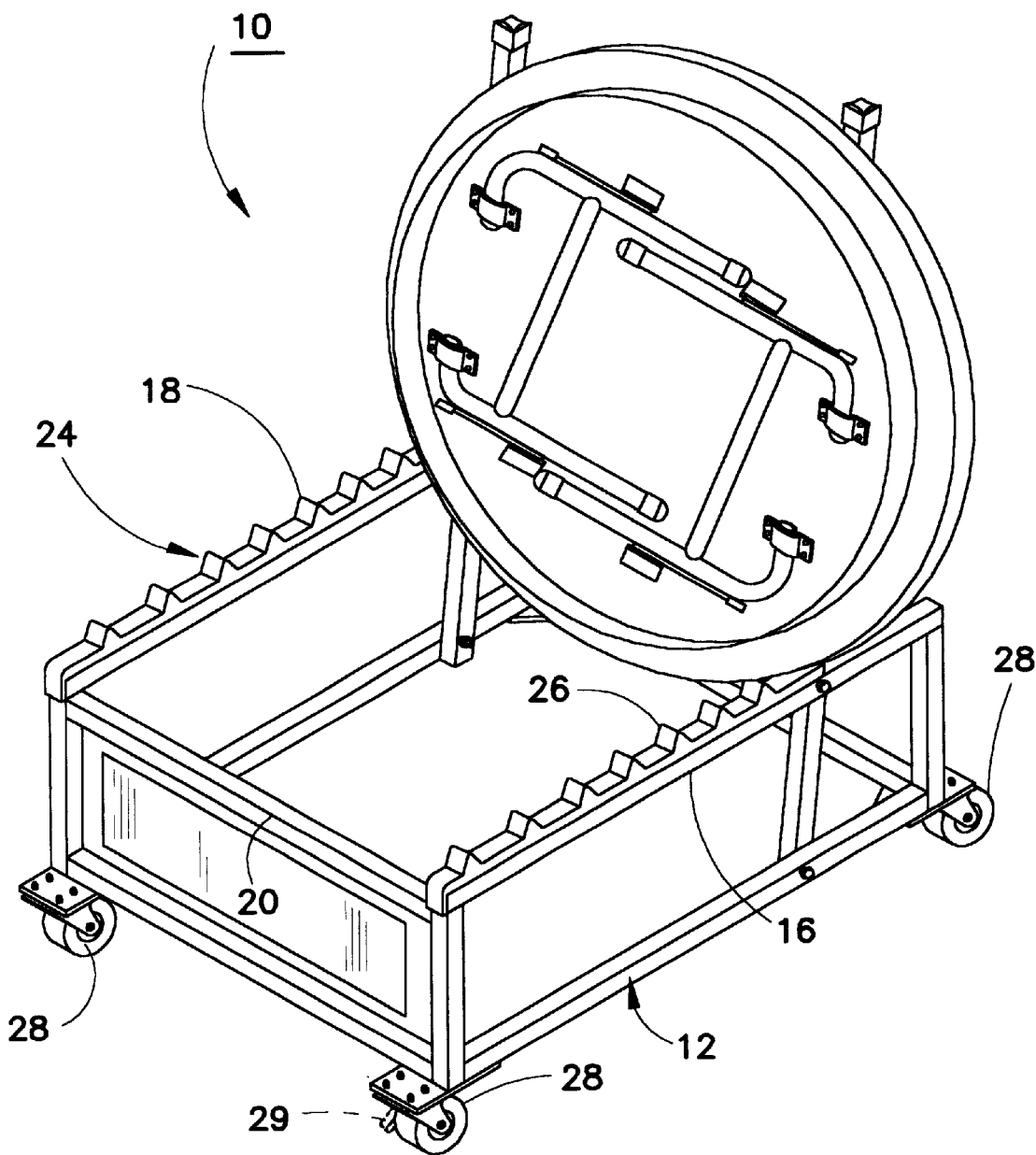
FIG. 6 is a perspective view similar to FIG. 1 except showing the manner in which round tables are positioned on the cart.

In FIG. 6, it can be seen how the open framework of base frame 12 permits loading of heavy round tables as well as rectangular tables. In this embodiment the frame ends 16, 18 are so spaced that the lower edge of the perimeter of the table is above the floor and yet, the tables are stable when positioned as described above. For purposes of illustration the ends are spaced about 30–31 inches for 4–6 foot diameter tables.

The fully castering wheels 24 allow the cart 10 to be rolled sideways, i.e., with the longitudinal axes of the folding tables carried thereon oriented in the direction of travel, for rolling the cart 10 through doorways or passages. It has been found that a cart capacity of about ten tables is optimum, as indicated by the tables F1 through F10 shown in FIG. 5, as this provides a cart 10 with ends 16 and 18, which are sufficiently short to pass laterally through conventional thirty inch wide doorways without difficulty. However, the cart 10 may be constructed to hold a larger or smaller number of tables, as desired.

Deployment of folding tables from the present cart 10 is accomplished essentially by reversing the procedure described above. The cart 10 is positioned as desired to deploy a folding table therefrom in the desired location (e.g., folding table F10 shown in broken lines in FIG. 5), and the supports of the table are extended from beneath the table top, in the manner shown in FIG. 4 of the drawings. The table is then tipped away from the next adjacent table (e.g., folding table F9) against which its top was resting or leaning, and the second edge lowered to place the first legs upon the supporting surface. The table may then be tilted further about the first legs by lowering the second edge, until all four legs of the table are resting upon the supporting surface. The cart 10 is repositioned as desired for deployment of the next table, and the process is repeated as desired.

In summary, the present cart for folding tables provides a much needed means for a single person to recover and fold a series of deployed folding tables, easily and quickly without undue stress and strain. The predetermined height of the base and angle of the table top supporting risers, enable a person to tilt a table onto the present cart without excessive effort due to the slightly overbalanced position of the tilted table during the initial and final stages of placing the table on the present cart. The dimensions of the cart and full castering on all wheels enable it to be rolled easily through standard size doorways, for movement into a hall for erection of tables carried thereon, for storage of the cart, either with or without tables stored thereon.

Deployment of tables from the present cart is accomplished just as easily as placement of tables onto the cart. The person erecting the tables need only unfold the table supports from the last table on the cart, i.e., the table farthest from the table top supporting risers, and pull the upper edge of the table away from the risers or adjacent table(s) on the cart. The upper edge of the table is lowered to place the top in a horizontal position after the lower legs have contacted the underlying surface. The present cart for folding tables will thus prove to be a most useful accessory for various clubs, associations, and organizations which have need to erect and store a series of folding tables from time to time, for banquets, meetings, or any other occasion as required.

It is to be understood that the present invention is not limited to the sole embodiment described above, but encompasses any and all embodiments within the scope of the following claims.

We claim:

1. A cart for heavy folding tables of a type used by hotels, convention centers, schools, and other institutions having a planar upper member supported by a rectangular support frame thereunder that includes a pair of spaced folding leg members for supporting said planar upper member approximately 29–30 inches above the floor, said cart comprising:

a base frame having an upper table receiving bed for supporting the lower edge of a table tipped thereon;

said bed having a height equal to or greater than one-half the height of said folding tables, the height of said bed relative to the height of said folding tables being such that when the cart is placed beneath a table, and the table is tipped over to a position approximately corresponding to the equilibrium position of the weight of the table, said bed is capable of supporting the weight of the table;

said base further including a tipped table support extending upwardly and at an angle from said bed for supporting a table top in the tilted and transporting position;

said table support having a steep slope extending upwardly and outwardly from said base such that the table, with the top thereof placed against said support structure and with the legs thereof extended over said base, is leaning slightly against said tipped table support in a stable orientation;

said bed further including guide ridges along at least opposed ends of said base frame defining a plurality of table edge holding notches therebetween;

whereby a single operator can easily load and unload said heavy folding tables.

2. The cart of claim 1 wherein said bed has a length less than 45 inches so that the cart may be pushed beneath the table when the table is erected.

3. The cart of claim 1 wherein said table receiving bed comprises a box frame with spaced, opposed side and end members, said end members including upper surfaces at said bed height on which said guide ridges are formed with said table edge holding notches, said end members being spaced apart sufficiently to support said tables in the folded position.

4. The cart of claim 3 wherein the space between said end members is approximately 40 inches and the bed height is approximately 19 inches for rectangular folding tables.

5. The cart of claim 4 wherein the effective width of said cart is less than 30 inches to permit access of a loaded cart through a conventional door.

6. The cart of claim 3 wherein the space between said end members is approximately 31 inches and the bed height is approximately 19½ inches for circular folding tables having a diameter of 4–6 feet.

7. The cart of claim 3 wherein said tipped table support comprises a pair of spaced arms forming a plane generally parallel to a line extending between corresponding notches in said end members for supporting a tipped table thereagainst.

8. The cart of claim 7 wherein said arms form an angle of approximately 80° with the horizontal.

9. The cart of claim 8 further including a handle extending between said arms.

10. The cart of claim 1 wherein said table receiving bed comprises a support surface extending across said base frame and said guide ridges are formed by a plurality of slats extending along said support surface forming a plurality of table edge holding channels therebetween.

* * * * *